(12) United States Patent
Matsumoto

(10) Patent No.: US 10,462,318 B2
(45) Date of Patent: Oct. 29, 2019

(54) IMAGE READING APPARATUS WITH A RESINOUS CONDUCTIVE SHEET

(71) Applicant: CANON KABUSHIKI KAISHA, Tokyo (JP)

(72) Inventor: Akira Matsumoto, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/980,951

(22) Filed: May 16, 2018

(65) Prior Publication Data

US 2018/0352102 A1   Dec. 6, 2018

(30) Foreign Application Priority Data

May 30, 2017   (JP) .................................. 2017-106433

(51) Int. Cl.
*H04N 1/00* (2006.01)

(52) U.S. Cl.
CPC ..... *H04N 1/00615* (2013.01); *H04N 1/00092* (2013.01); *H04N 1/00806* (2013.01); *H04N 1/00994* (2013.01)

(58) Field of Classification Search
None
See application file for complete search history.

(56) References Cited

U.S. PATENT DOCUMENTS

| | | | | |
|---|---|---|---|---|
| 6,349,155 B1* | 2/2002 | Youda | ................ | H04N 1/00976 358/474 |
| 8,797,608 B2 | 8/2014 | Seto | | |
| 9,832,331 B2* | 11/2017 | Ogasawara | ........ | H04N 1/00795 |
| 9,843,692 B2* | 12/2017 | Katayama | ............ | H04N 1/0057 |
| 2003/0117673 A1* | 6/2003 | Yamanaka | .......... | H04N 1/00551 358/498 |
| 2005/0179963 A1* | 8/2005 | Nagano | ................ | H04N 1/1215 358/475 |
| 2008/0138612 A1* | 6/2008 | Kondo | .................... | C03C 17/30 428/336 |

(Continued)

FOREIGN PATENT DOCUMENTS

| | | | |
|---|---|---|---|
| JP | 2001063116 A | * | 3/2001 |
| JP | 2010-136193 A | | 6/2010 |

OTHER PUBLICATIONS

Shimozono, Takahiro; Thermal Head [English Translation]; Mar. 2001, par 0024-0028 (Year: 2001).*

*Primary Examiner* — Miya J Williams
(74) *Attorney, Agent, or Firm* — Venable LLP

(57) ABSTRACT

The image reading apparatus according to the present invention includes an original conveyor configured to convey an original, and a first image reader, which includes a first light transmitting member, and is configured to read, through the first light transmitting member, an image on a first surface of the original conveyed by the original conveyor. A fluorine-containing organic compound coating is applied in a first region on a surface of the first light transmitting member to be brought into contact with the first surface of the original. A conductive resin sheet is provided in a second region that is positioned on an upstream side in a conveying direction of the original with respect to the first region on the surface of the first light transmitting member. The conductive resin sheet is electrically connected to a grounded metal portion of the image reading apparatus.

16 Claims, 6 Drawing Sheets

(56) References Cited

U.S. PATENT DOCUMENTS

| | | | |
|---|---|---|---|
| 2009/0185238 A1* | 7/2009 | Wu | H04N 1/00909 358/474 |
| 2010/0142007 A1* | 6/2010 | Seto | H04N 1/00572 358/474 |
| 2012/0187548 A1* | 7/2012 | Kugler | C08J 7/042 257/632 |
| 2013/0174892 A1* | 7/2013 | Ganjoo | H01B 1/08 136/252 |
| 2018/0348073 A1* | 12/2018 | Biesheuvel | G01L 1/18 |
| 2018/0352101 A1* | 12/2018 | Takizawa | H04N 1/00596 |

* cited by examiner

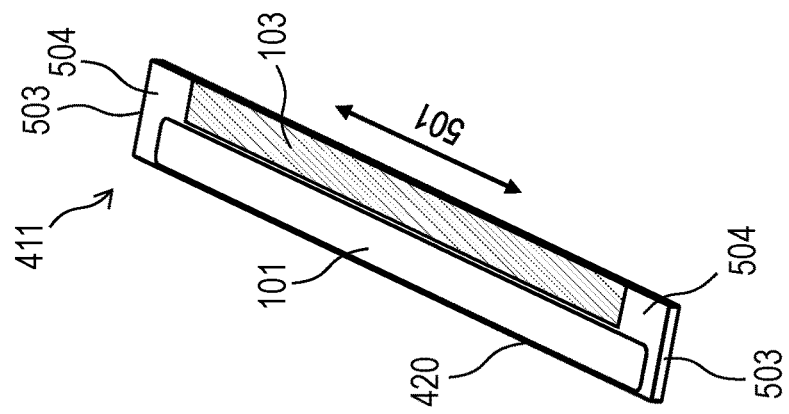
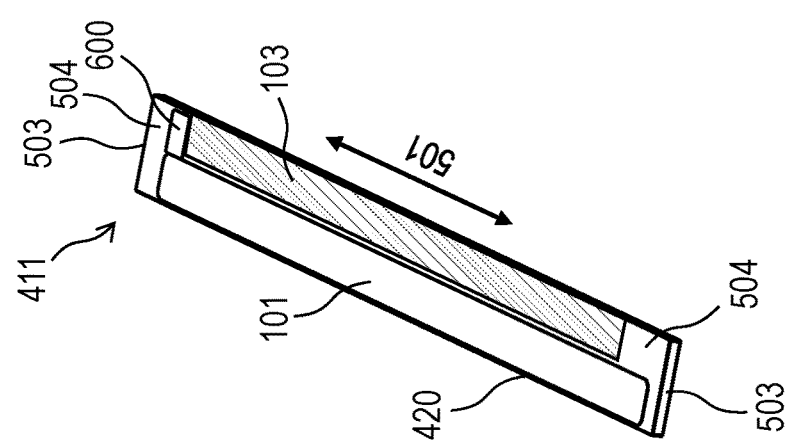
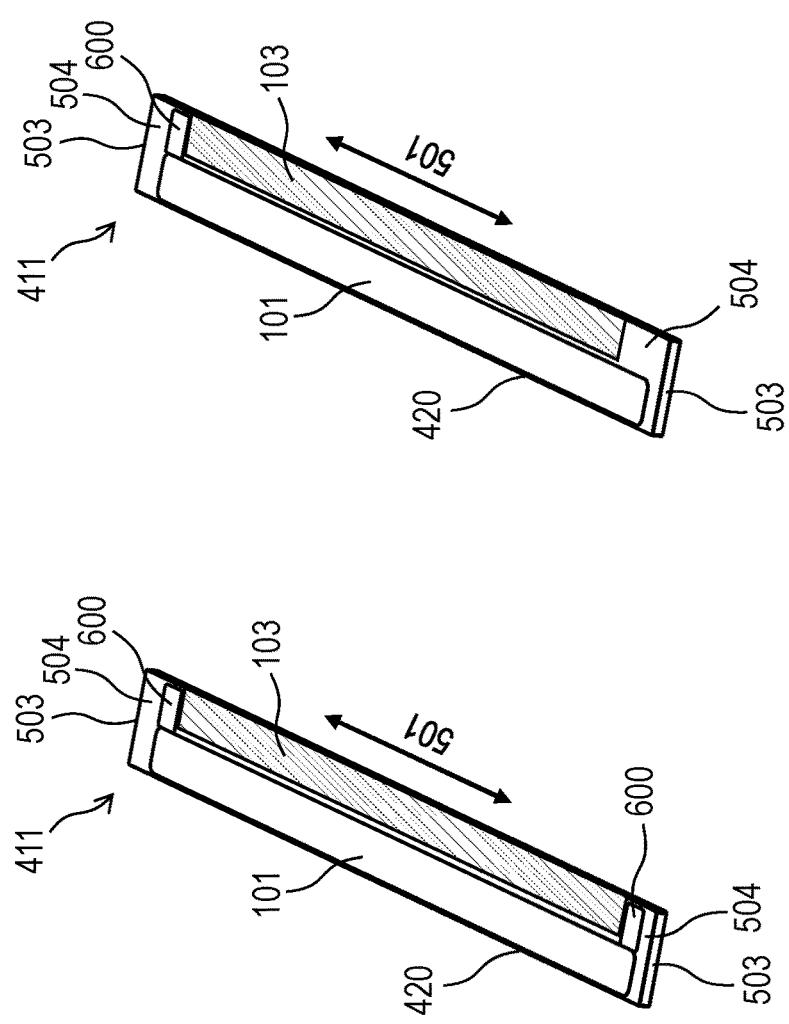

IMAGE READING APPARATUS WITH A RESINOUS CONDUCTIVE SHEET

BACKGROUND OF THE INVENTION

Field of the Invention

The present invention relates to an image reading apparatus, and more particularly, to an image reading apparatus, which is installed in an image forming apparatus, such as a copying machine, a facsimile apparatus, or a multifunction peripheral, and is configured to read an image of an original to be conveyed by an automatic original feeding device.

Description of the Related Art

Hitherto, as an image reading apparatus installed in an image forming apparatus, such as a copying machine, a facsimile apparatus, or a multifunction peripheral, there has been known an image reading apparatus, which includes an auto document feeder (ADF), and is configured to read an image of an original to be conveyed by the ADF.

It has been known that such a problem arises that, when an image reader reads an image of the original to be conveyed by the ADF, floating dirt such as dust and paper dust, or adhesive dirt, such as paste of Post-it (sticky note) and uncured correction fluid adhering to the original may adhere onto a platen glass, and thus causes a streak-like image defect on the read image.

In Japanese Patent Application Laid-Open No. 2010-136193, the following image reading apparatus is disclosed. In the disclosed image reading apparatus, a conductive coating is applied on a surface of a platen glass to be brought into contact with an original to be conveyed, and a conductive conveyance guiding metal plate member is provided on the conductive coating on an upstream side in a conveying direction in order to reduce contact pressure of the original on the conductive coating.

With this configuration, electrification of the conveyed original and the floating dirt is prevented, and a force of attracting the floating dirt onto the surface of the platen glass is reduced.

However, in Japanese Patent Application Laid-Open No. 2010-136193, no consideration is given to adhesion of the adhesive dirt on the surface of the platen glass.

Further, as the conveyance guiding member, the conductive metal plate member is used to establish grounding. Thus, when the original is conveyed, a surface or an edge of the metal plate member and the original rub against each other, with the result that the original itself generates paper dust being the floating dirt.

SUMMARY OF THE INVENTION

Therefore, it is an object of the present invention to provide an image reading apparatus including a platen glass (light transmitting member) capable of reducing adhesion of both floating dirt and adhesive dirt.

According to one embodiment of the present invention, there is provided an image reading apparatus, including: an original conveyor configured to convey an original; and a first image reader, which includes a first light transmitting member, and is configured to read, through the first light transmitting member, an image on a first surface of the original conveyed by the original conveyor, wherein a fluorine-containing organic compound coating is applied in a first region on a surface of the first light transmitting member to be brought into contact with the first surface of the original, wherein a conductive resin sheet is provided in a second region that is positioned upstream in a conveying direction of the original with respect to the first region on the surface of the first light transmitting member, and wherein the conductive resin sheet is electrically connected to a grounded metal portion of the image reading apparatus.

Further features of the present invention will become apparent from the following description of exemplary embodiments with reference to the attached drawings.

BRIEF DESCRIPTION OF THE DRAWINGS

FIG. 3A is a perspective view for illustrating the first platen glass in one embodiment of the present invention.

FIG. 3B is a perspective view for illustrating the first platen glass in one embodiment of the present invention.

FIG. 3C is a perspective view for illustrating the first platen glass in one embodiment of the present invention.

DESCRIPTION OF THE EMBODIMENTS

Now, an image reading apparatus according to one embodiment of the present invention is described in detail with reference to the attached drawings. However, the following embodiments are exemplary embodiments of the present invention, and do not limit the technical scope of the present invention. In the following drawings, for ease of understanding of the present invention, dimensions of illustrated components may be different from actual dimensions.

Figure 6:
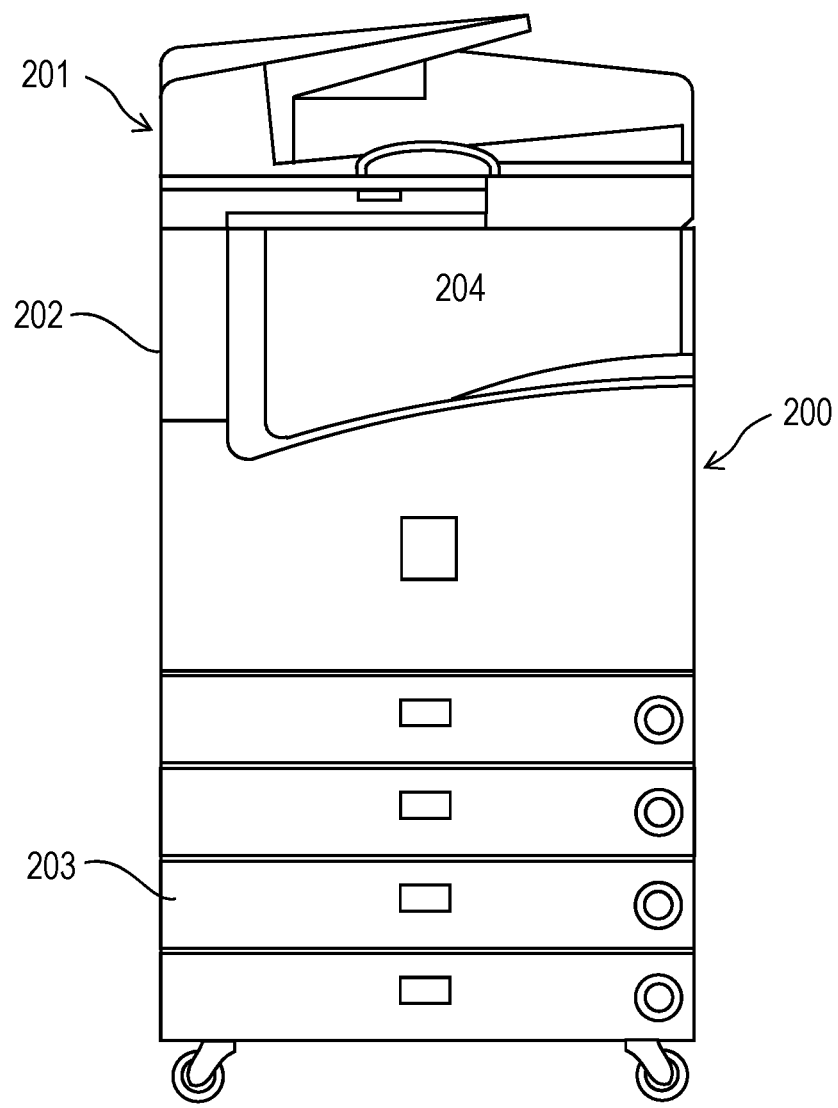
FIG. 6 is a schematic front view for illustrating an image forming apparatus including the image reading apparatus according to one embodiment of the present invention.

FIG. 6 is a schematic front view for illustrating an image forming apparatus 200 including an image reading apparatus 201 according to one embodiment of the present invention.

The image forming apparatus 200 described below is merely an example of the embodiments of the present invention. A facsimile apparatus, an ink jet printer, a multifunction peripheral, and other apparatus including the image reading apparatus 201 also correspond to the image forming apparatus including the image reading apparatus according to one embodiment of the present invention.

As illustrated in FIG. 6, the image forming apparatus 200 includes an image forming portion main body 202, a sheet feeding cassette 203, and the image reading apparatus 201.

The image forming portion main body 202 is configured to form an image on a recording sheet (material to be subjected to recording). The sheet feeding cassette 203 is mounted to a lower portion of the image forming portion main body 202, and is configured to allow recording sheets to be stacked thereon. The image reading apparatus 201 is mounted to an upper portion of the image forming portion main body 202, and is configured to read an image of an original.

An image forming unit (not shown) is arranged inside the image forming portion main body 202 at substantially a center portion of the image forming portion main body 202. Below the image forming unit, a sheet feeding unit (not shown) is arranged. The sheet feeding unit is configured to feed the recording sheet, and includes the sheet feeding cassette 203.

Further, above the image forming portion main body 202, there is arranged the image reading apparatus 201 including a charge-coupled device (CCD) or the like, which being a reading unit configured to read an image of an original.

In a space defined between the image reading apparatus 201 and the image forming portion main body 202, a main-body sheet discharge portion 204 is formed. On the main-body sheet discharge portion 204, the recording sheets conveyed and discharged by the image forming portion main body 202 are stacked.

In the image forming portion main body 202, an electrophotographic printer engine having hitherto been well known is installed as the image forming unit. A laser writing portion, an electrophotographic process portion, a fixing portion, and the like (not shown) are built in the electrophotographic printer engine.

Further, as the sheet feeding unit, a sheet feeding roller or the like (not shown) is built in the image forming portion main body 202. The sheet feeding roller is configured to separate and feed the recording sheets placed on the sheet feeding cassette 203, to thereby supply the recording sheets to the image forming unit.

Figure 1A:
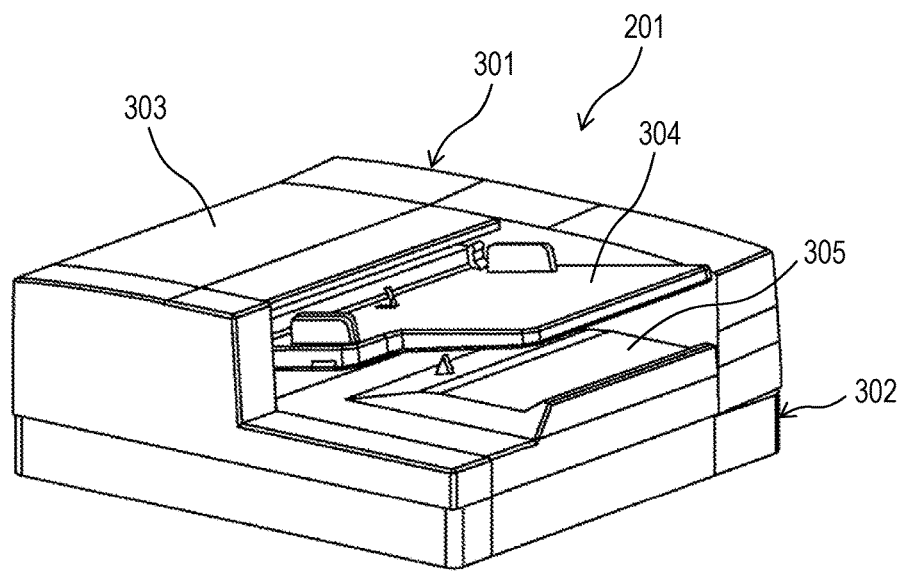
FIG. 1A is a perspective view for illustrating an image reading apparatus according to one embodiment of the present invention.
Figure 1B:
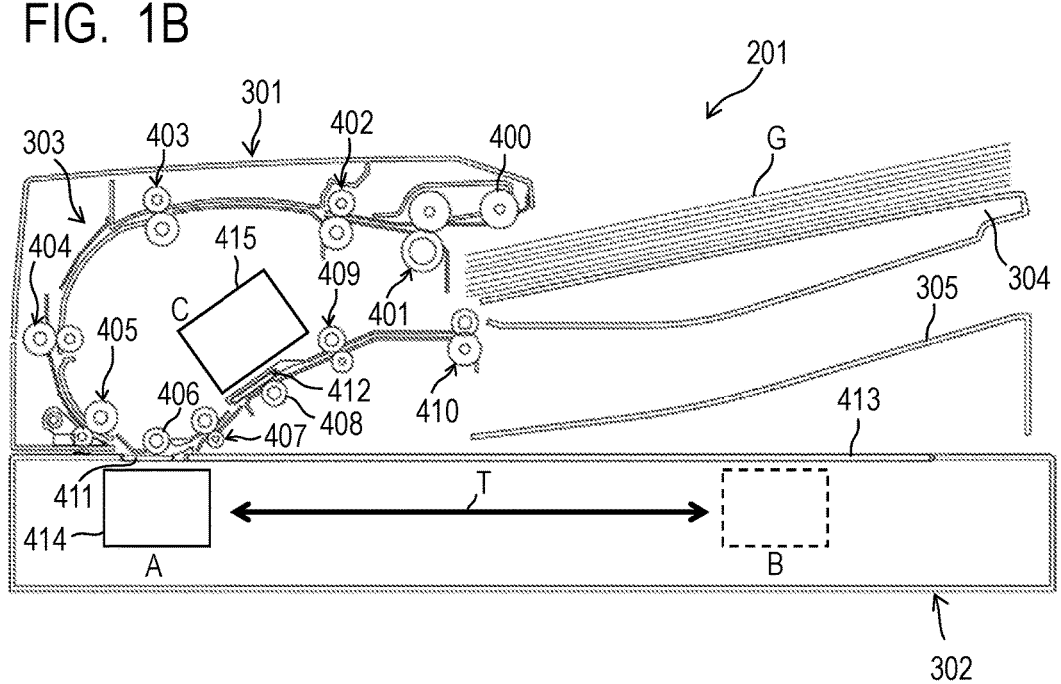
FIG. 1B is a sectional view for illustrating the image reading apparatus according to one embodiment of the present invention.

FIG. 1A and FIG. 1B are respectively a perspective view and a sectional view for illustrating the image reading apparatus 201 according to one embodiment of the present invention.

As illustrated in FIG. 1A and FIG. 1B, the image reading apparatus 201 includes an auto document feeder (ADF) (original conveyor) 301 and a reader (first image reader) 302. The reader 302 is installed below the ADF 301, and is configured to read an image on one surface (front surface or first surface) of the original conveyed by the ADF 301.

The ADF 301 is configured to separate the plurality of originals one by one and feed the separated original to the reader 302. The ADF 301 includes an original tray 304 and an original conveying unit 303. The plurality of originals to be fed are placed on the original tray 304. The original conveying unit 303 is configured to separate and feed the originals placed on the original tray 304 one by one so as to convey the separated and fed original to the reader 302. Further, the ADF 301 includes a sheet discharge tray 305 on which the discharged original is placed after the reader 302 reads an image.

As illustrated in FIG. 1B, the ADF 301 includes, as members constructing the original conveying unit 303, a pickup roller 400 and a separation roller pair 401 configured to separate and feed a plurality of originals G placed on the original tray 304. Further, the ADF 301 includes, as members constructing the original conveying unit 303, a plurality of roller pairs 402, 403, 404, 405, 407, 409, and 410 configured to convey the original G separated and fed by the separation roller pair 401 and platen rollers 406 and 408.

Specifically, the original conveying unit 303 includes the pickup roller 400, the separation roller pair 401, and the pulling roller pair 402. The pulling roller pair 402 is provided downstream of the separation roller pair 401, and is configured to pull out the original G conveyed from the separation roller pair 401.

Further, the original conveying unit 303 includes the conveyance roller pair 403 and the registration roller pair 404. The conveyance roller pair 403 is provided downstream of the pulling roller pair 402, and is configured to convey, to downstream roller pairs, the original G conveyed by the pulling roller pair 402. The registration roller pair 404 is provided downstream of the conveyance roller pair 403, and is configured to correct inclination of the original G.

Still further, the original conveying unit 303 includes the first lead roller pair 405, the first platen roller (first conveying member) 406, the second lead roller pair 407, the second platen roller (second conveying member) 408, and the third lead roller pair 409. The first lead roller pair 405 is provided downstream of the registration roller pair 404 and is configured to stabilize the reading of the image of the original G. Herein, as the first conveying member, the first platen roller 406 to be rotated is exemplified. However, there may be adopted a platen guide configured to guide the original without rotating. Similarly, as the second conveying member, a platen guide may be adopted in place of the second platen roller 408.

Further, the original conveying unit 303 includes the sheet discharge roller pair 410. The sheet discharge roller pair 410 is provided downstream of the third lead roller pair 409, and is configured to discharge, to the sheet discharge tray 305, the original G having undergone image reading.

The reader 302 is installed below the ADF 301. Inside the reader 302, a first image reading unit 414 is installed so as to be movable on a rail (not shown) along a sub-scanning direction T. The first image reading unit 414 is configured to read the image on the front surface of the original G conveyed by the ADF 301 onto a first platen glass (first light transmitting member) 411, or the image of the original placed on an original table glass 413.

When the image on the front surface of the original G conveyed by the ADF 301 is read (at the time of reading of the flowed original), the first image reading unit 414 stops at a first position A that is on an opposed side (lower side) of the first platen roller 406 and below the first platen glass 411, and then reads the image.

Meanwhile, when the image of the original placed on the original table glass 413 is read (at the time of reading of the fixed original), the first image reading unit 414 performs scanning while being moved through drive of a motor (not shown) from the first position A to a second position B along the sub-scanning direction T, thereby reading the image of the original on the original table glass 413. The ADF 301 is supported on the reader 302 in a freely pivotable manner so as to be capable of exposing an upper surface of the original table glass 413 when the original is placed on the original table glass 413.

In addition, inside the ADF 301, a second platen glass (second light transmitting member) 412 is provided on an opposed side of the second platen roller 408 so as to read an image on another surface (back surface or second surface, which being surface opposite to the first surface) of the conveyed original G. Further, a second image reading unit (second image reader) 415 is installed across the second platen glass 412 at a position C opposed to the second platen roller 408.

With this configuration, when the original G is conveyed by the ADF 301, images on both front and back surfaces of the original G can be read by the first image reading unit 414 and the second image reading unit 415.

Herein, a configuration of a light transmitting member in one embodiment of the present invention described below is applicable not only to the first platen glass 411 but also to the second platen glass 412 similarly.

Accordingly, the first platen glass 411 and the second platen glass 412 may be collectively referred to as a platen glass. Further, the first platen roller 406 and the second platen roller 408 may be collectively referred to as a platen roller.

The configuration of the light transmitting member in one embodiment of the present invention is described using the first platen glass 411 as an example.

Figure 2A:
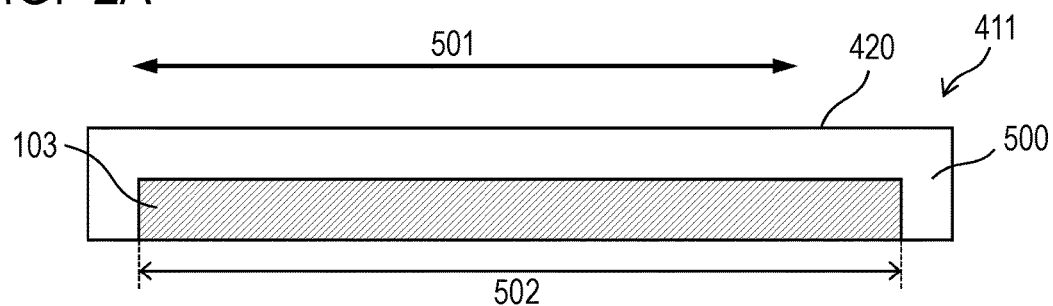
FIG. 2A is a view for illustrating a fluorine coating applied on a first platen glass in one embodiment of the present invention.

FIG. 2A is a view for illustrating a fluorine coating 103 applied on the first platen glass 411 in one embodiment of the present invention.

In the following description, floating dirt refers to, for example, dust and paper dust, and adhesive dirt refers to, for example, paste of a sticky note and uncured correction fluid adhering to the original.

In the first platen glass 411 in one embodiment of the present invention, the transparent fluorine coating (fluorine-containing organic compound coating) 103 is applied in a first region of a glass substrate 420, which is a downstream region in a conveying direction on an original-side surface of the glass substrate 420 that is brought into contact with the conveyed original.

The first region does not extend to each end portion on the original-side surface of the first platen glass 411 in a main scanning direction 501.

Here, in other words, the main scanning direction 501 is a direction (first direction) perpendicular to the conveying direction of the original in a plane parallel to the original-side surface of the first platen glass 411.

Examples of the fluorine coating 103 include a silicon-containing perfluoropolyether compound coating.

A region on the original-side surface of the glass substrate 420, on which the fluorine coating 103 is not applied, that is, a region other than the first region, is referred to as an uncoated region 500.

The fluorine coating 103 is directly applied on the glass substrate 420 in a deposition furnace by vacuum deposition without intermediation of an intermediate layer.

In the embodiment illustrated in FIG. 2A, the first region and an image reading region 502 substantially conform to each other. Owing to the fluorine coating 103, adhesion of the adhesive dirt, such as the paste and the uncured correction fluid, on the image reading region 502 of the first platen glass 411 can be sufficiently reduced. Thus, a streak-like image defect caused by the adhesive dirt can be sufficiently reduced.

Further, as described later with reference to FIG. 3A to FIG. 3C, for the first platen glass 411 in one embodiment of the present invention, the uncoated region 500 is provided. A conductive resin sheet 101 and an adjustment member (first abutment member) 600 are bonded on the uncoated region 500.

This is to prevent the conductive resin sheet 101 and the adjustment member 600 from peeling off because of insufficient adhesive strength when the conductive resin sheet 101 and the adjustment member 600 are bonded on the fluorine coating 103.

The uncoated region 500 may be formed by coating removal processing after the fluorine coating 103 is formed.

That is, when the fluorine coating 103 is formed on the first platen glass 411 by vacuum deposition, without using masking, the fluorine coating 103 is applied on the entire original-side surface. Then, in a latter step, the uncoated region 500 may be formed in such a manner that a part of the fluorine coating 103 is removed or an effect of the part of the fluorine coating 103 is reduced by processing a region conforming to the uncoated region 500 by sand blasting or the like.

Also in this case, the above-mentioned preventing effect can be obtained.

FIG. 3A, FIG. 3B, and FIG. 3C are perspective views for respectively illustrating the first platen glasses 411 in a first embodiment, a second embodiment, and a third embodiment of the present invention.

Figure 4:
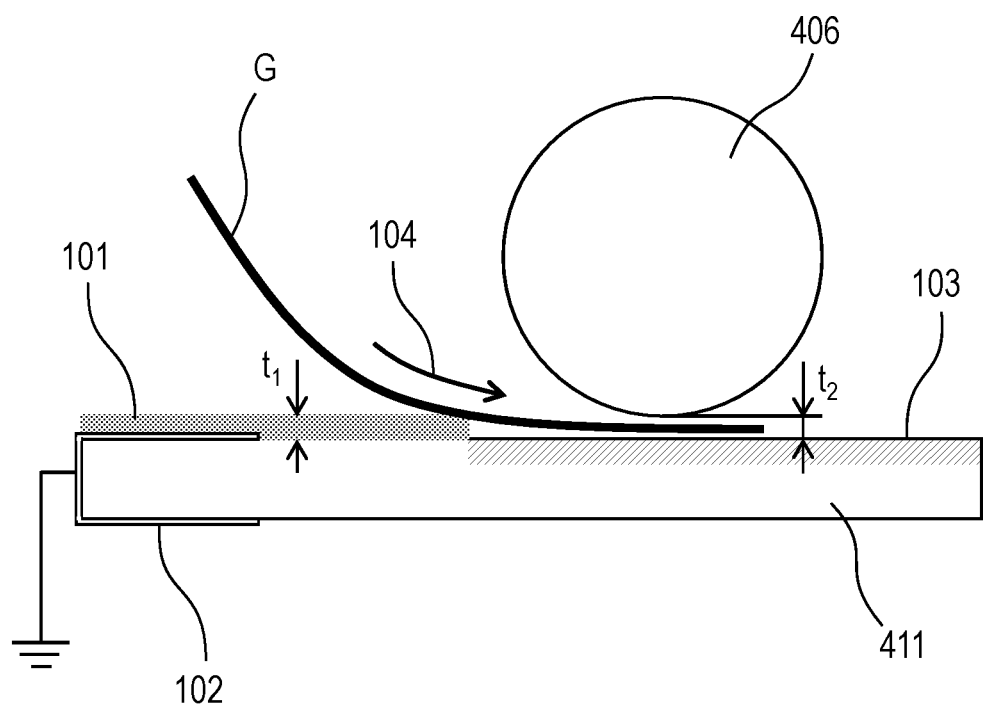
FIG. 4 is a schematic sectional view for illustrating a vicinity of the first platen glass of the image reading apparatus according to the present invention, which is taken along a sub-scanning direction.

Further, FIG. 4 is a schematic sectional view for illustrating a vicinity of the first platen glass 411 of the image reading apparatus 201 according to one embodiment of the present invention, which is taken along the sub-scanning direction.

As illustrated in FIG. 4, in the first platen glass 411, an aluminum tape serving as a grounding member 102 is bonded on at least a part of a second region, which is a region of the uncoated region 500 (see FIG. 2A to FIG. 2C) on the original-side surface of the first platen glass 411 on an upstream side in the conveying direction with respect to the first region having the fluorine coating 103.

As illustrated in FIG. 3A, FIG. 3B, FIG. 3C, and FIG. 4, in the second region, the conductive resin sheet 101 is bonded on the aluminum tape with a conductive double-sided adhesive tape (conductive adhesive member) (not shown). In the embodiment illustrated in FIG. 4, the second region includes a region in which the aluminum tape 102 is not interposed between the conductive resin sheet 101 and the first platen glass 411, and a region in which the aluminum tape 102 is interposed between the conductive resin sheet 101 and the first platen glass 411. In the region in which the aluminum tape 102 is not interposed between the conductive resin sheet 101 and the first platen glass 411, the conductive resin sheet 101 and the first platen glass 411 are bonded to each other with the conductive double-sided adhesive tape. In the region in which the aluminum tape 102 is interposed between the conductive resin sheet 101 and the first platen glass 411, the conductive resin sheet 101 and the first platen glass 411 are bonded to each other with the conductive double-sided adhesive tape through intermediation of the aluminum tape 102. That is, the conductive resin sheet 101 and the aluminum tape 102 are bonded to each other with the conductive double-sided adhesive tape, and the aluminum tape 102 and the first platen glass 411 are bonded to each other with the conductive double-sided adhesive tape.

In the first to third embodiments of the present invention, the second region substantially conforms to the region on which the conductive resin sheet 101 is bonded.

As the conductive resin sheet 101, for example, a black ultra high molecular weight polyethylene sheet (NITTO DENKO CORPORATION, No. 440, black) is used.

The black ultra high molecular weight polyethylene sheet, which is the conductive resin sheet 101, has conductivity and an electric resistance value of 500 kΩ or less.

Accordingly, through the grounding member 102, the conductive resin sheet 101 can be electrically connected to a main body of the image reading apparatus 201, specifically, to a grounded metal portion (not shown) such as a sheet metal frame.

Thus, the conveyed original is brought into contact with the conductive resin sheet 101, thereby being capable of eliminating static electricity generating from the original and from the floating dirt adhering to the original. Then, the floating dirt, from which static electricity is eliminated, is not electrostatically attracted onto the first platen glass 411. Accordingly, the floating dirt over the first platen glass 411 can be easily removed through clearing of the floating dirt by the conveyed original, that is, through self-cleaning by the conveyed original.

Further, even when the conductive resin sheet 101 rubs against the conveyed original, the conductive resin sheet 101 is not electrified. Owing to the electrification preventing effect, the floating dirt such as the dust and the paper dust at a periphery of the conductive resin sheet 101 can be prevented from being attracted to the conductive resin sheet 101.

The applicant of the prevent application has found out the following. It is preferred that, in a direction (second direction) perpendicular to the original-side surface of the first platen glass 411, a distance t1 between the original-side surface of the first platen glass 411 and a surface of the conductive resin sheet 101 to be brought into contact with the original be equal to or larger than 0.05 mm and be equal to or smaller than 1.0 mm.

Further, the black ultra high molecular weight polyethylene sheet, which is selected as the conductive resin sheet 101, has a small coefficient of friction. Accordingly, the black ultra high molecular weight polyethylene sheet is excellent in sliding performance, and has softer edges of the sheet than a hitherto-used metal plate. Therefore, an amount of the paper dust generated by rubbing between a sheet member and the original can be significantly reduced.

By virtue of the electrification preventing effect, the static electricity eliminating effect, and the sliding performance effect of the conductive resin sheet 101 as described above, the streak-like image defect caused by the floating dirt, such as the dust and the paper dust, can be reduced.

Further, as illustrated in FIG. 3A and FIG. 3B, with a double-sided adhesive tape, which being an adhesive member (not shown), the adjustment member 600 is bonded on a third region 504 that includes end portions 503 of the uncoated region 500 (see FIG. 2A to FIG. 2C) in the main scanning direction 501 on the original-side surface of the first platen glass 411.

That is, in the first embodiment illustrated in FIG. 3A, the adjustment member 600 is provided at a vicinity of each end portion in the main scanning direction 501 on the original-side surface of the first platen glass 411.

Meanwhile, in the second embodiment illustrated in FIG. 3B, the adjustment member 600 is provided only at a vicinity of one of end portions in the main scanning direction 501 on the original-side surface of the first platen glass 411.

Further, in the third embodiment illustrated in FIG. 3C, the adjustment member 600 is not provided at a vicinity of any end portion in the main scanning direction 501 on the original-side surface of the first platen glass 411.

Here, the third region 504, on which the adjustment member 600 is bonded, is outside an image reading effective region 502 configured to read the image of the original (outside the image reading region). That is, the third region 504 is structured so as to prevent the conveyed original from rubbing against the adjustment member 600.

Therefore, the adjustment member 600 is not frictionally electrified, and the double-sided adhesive tape, which being the adhesive member, does not need to be the conductive double-sided adhesive tape. Further, it is not necessary to electrically connect the adjustment member 600 to the main body of the image reading apparatus 201 through the grounding member 102.

The reason why the adjustment member 600 is provided on the first platen glass 411 in the embodiments of the present invention is to secure a predetermined gap t2 between the first platen roller 406 and the first region conforming to the image reading region 502 of the first platen glass 411 without increasing a thickness of the conductive resin sheet 101 substantially corresponding to the distance t1 more than necessary as described later.

Figure 5:
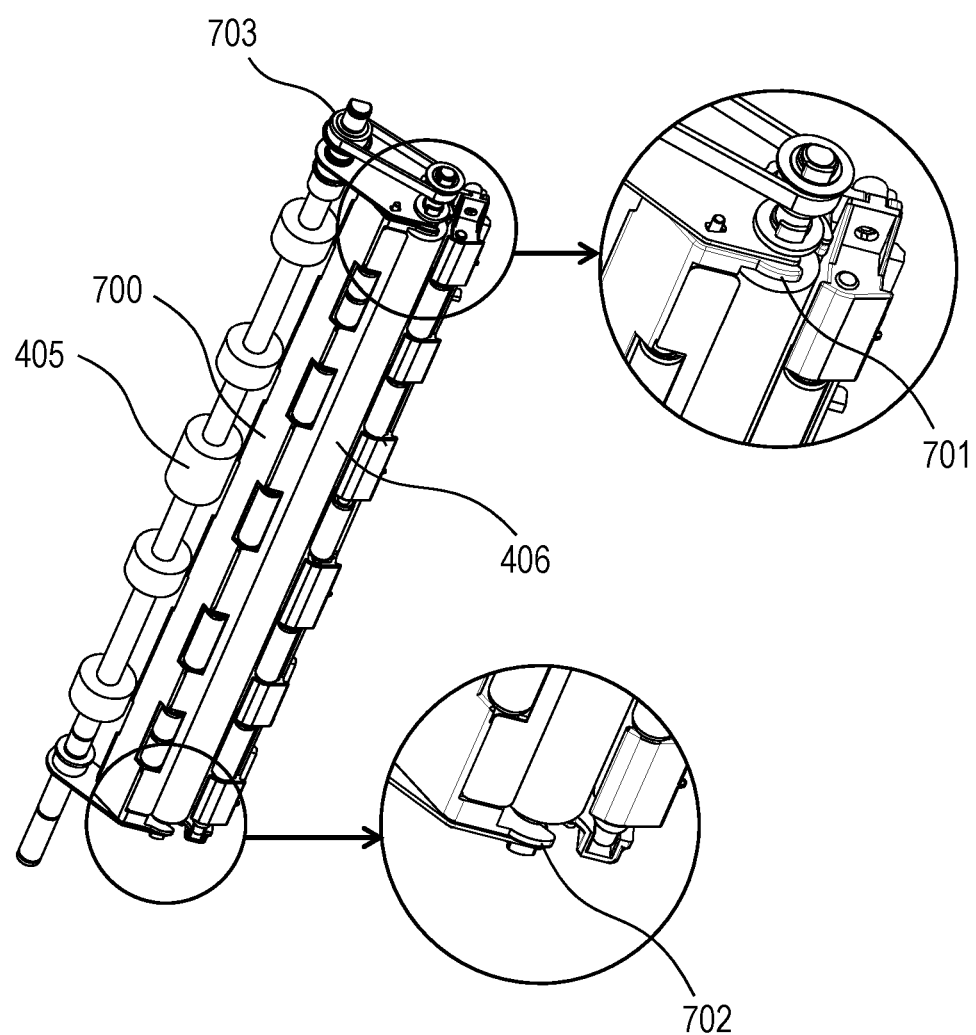
FIG. 5 is a perspective view for illustrating a first platen roller in one embodiment of the present invention.

FIG. 5 is a perspective view for illustrating the first platen roller 406 in one embodiment of the present invention.

Specifically, in the first embodiment of the present invention, a near-side abutment portion (protruding portion) 701 and a deep-side abutment portion (protruding portion) 702 are formed on both sides in the main scanning direction 501 of a platen roller holder 700 (first holding member) configured to hold the first platen roller 406 as illustrated in FIG. 5. Further, the adjustment member 600, which is provided at the vicinity of each end portion of the first platen glass 411 as illustrated in FIG. 3A, is held in abutment against each of the near-side abutment portion 701 and the deep-side abutment portion 702.

With this configuration, between the first platen glass 411 and the first platen roller 406, over a range in the main scanning direction 501 between the near-side abutment portion 701 and the deep-side abutment portion 702, the predetermined gap t2 is secured.

When the gap t2 between the first platen glass 411 and the first platen roller 406 is extremely small, the streak-like image defect caused by the floating dirt can be solved through self-cleaning by the conveyed original. Meanwhile, contact pressure on the fluorine coating 103 is intensified. As a result, an amount of the adhesive dirt adhering on the first platen glass 411 is increased, and the streak-like image defect caused by the adhesive dirt is further deteriorated. Further, also a lifetime of the fluorine coating 103 is reduced.

Meanwhile, when the gap t2 is extremely large, the streak-like image defect caused by the adhesive dirt, and the reduction in the lifetime of the fluorine coating 103 are solved. However, in accordance with difficulty in self-cleaning, the streak-like image defect caused by the floating dirt is significantly deteriorated. In addition, in accordance with unnecessary separation between the first platen glass 411 and the conveyed original, also image defect resulting from color misregistration, main scanning magnification, or the like occurs.

Therefore, in order to solve all of the problems, such as the streak-like image defect caused by the floating dirt and the adhesive dirt, the reduction in the lifetime of the fluorine coating 103, and the image defect resulting from color misregistration, main scanning magnification, or the like, it is required to adjust the gap t2 by a dimension of 0.1 mm.

Accordingly, in the embodiment of the present invention, the adjustment member 600 is provided on the first platen glass 411 so that the gap t2 between the first platen glass 411 and the first platen roller 406 has an optimum value over the range in the main scanning direction between the near-side abutment portion 701 and the deep-side abutment portion 702.

The applicant of the prevent application has found out that it is preferred that the gap t2 be equal to or larger than 0.1 mm and be equal to or smaller than 1.0 mm.

It is preferred that the adjustment member 600 be formed of a metal plate rather than a resin sheet such as a plastic.

This is because, in the resin sheet such as the plastic, when the near-side abutment portion 701 and the deep-side abutment portion 702 of the platen roller holder 700 are held in contact with the adjustment members 600, deformation such as creep deformation is caused by load of the ADF 301, with the result that the gap t2 cannot be secured.

Next, as illustrated in FIG. 3B, for the first platen glass 411 in the second embodiment of the present invention, the adjustment member 600 is provided on only one of end portions (deep-side end portion) of the first platen glass 411 in the main scanning direction.

This is because, as described later, there may be a sufficient case in which the adjustment member 600 is bonded on only one of end portions of the first platen glass 411 in the main scanning direction in some configurations of the ADF 301.

As illustrated in FIG. 3B, for the first platen glass 411 in the second embodiment of the present invention, the adjustment member 600 is bonded on only the deep-side end portion on the original-side surface in the main scanning direction 501.

The above-mentioned configuration of the second embodiment in which the adjustment member 600 is bonded on only the deep-side end portion in the main scanning direction 501 can be adopted owing to a configuration of driving the first platen roller 406 as described below.

As illustrated in FIG. 5, the first platen roller 406 is held by the platen roller holder 700 through intermediation of bearings.

In order to drive the first platen roller 406, on the near side of the first platen roller 406, a platen roller driving belt 703 is arranged so as to be directed obliquely upward.

In a case of this configuration, on the deep side of the first platen roller 406 where the platen roller driving belt 703 is not provided, the first platen roller 406 is lowered in a direction of gravity not only by a fitting play between the bearing and a shaft of the first platen roller 406 but also by a fitting play between the bearing and the platen roller holder 700.

Thus, the gap t2 between the first platen glass 411 and the first platen roller 406 is smaller on the deep side than that on the near side.

Meanwhile, on the near side of the first platen roller 406 having the platen roller driving belt 703, the platen roller driving belt 703 is arranged so as to be directed obliquely upward. Accordingly, by a tensile force of the belt, the first platen roller 406 is raised obliquely upward by the above-mentioned plays.

As a result, the gap t2 between the first platen glass 411 and the first platen roller 406 is larger on the near side than that on the deep side.

Based on the above description, for the first platen glass 411 in the second embodiment of the present invention, the adjustment member 600 is bonded on only the deep side on which the gap t2 is relatively small. With this configuration, over the range in the main scanning direction between the near-side abutment portion 701 and the deep-side abutment portion 702, the gap t2 between the first platen glass 411 and the first platen roller 406 is secured.

Next, as illustrated in FIG. 3C, in the first platen glass 411 in the third embodiment of the present invention, the adjustment member 600 is not provided at a vicinity of any end portion in the main scanning direction.

This corresponds to a case where the near-side abutment portion 701 and the deep-side abutment portion 702 of the platen roller holder 700 are structured so as to protrude to the first platen glass 411 side from an outer peripheral surface of the first platen roller 406 illustrated in FIG. 5.

In this case, even when considering the above-mentioned fitting plays, a component tolerance, and the like, over the range in the main scanning direction between the near-side abutment portion 701 and the deep-side abutment portion 702, the gap t2 between the first platen glass 411 and the first platen roller 406 can be secured.

Therefore, in this case, it is not necessary to bond the adjustment member 600 at a vicinity of any end portion in the main scanning direction 501.

Figure 2B:
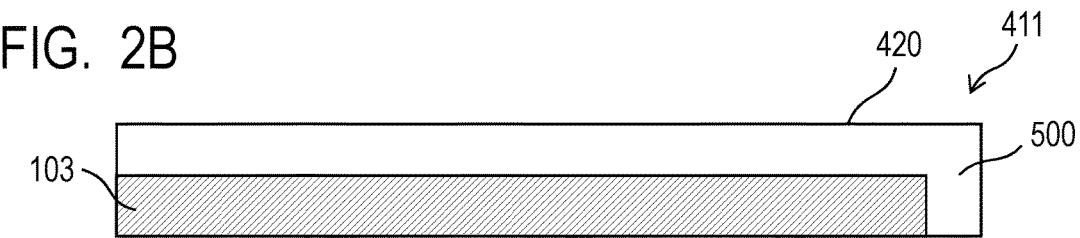
FIG. 2B is a view for illustrating the fluorine coating applied on the first platen glass in one embodiment of the present invention.

As in the second embodiment, when the adjustment member 600 is provided on only one of the end portions on the original-side surface of the first platen glass 411 in the main scanning direction 501, as illustrated in FIG. 2B, the fluorine coating 103 may extend to another one of the end portions 503.

Figure 2C:
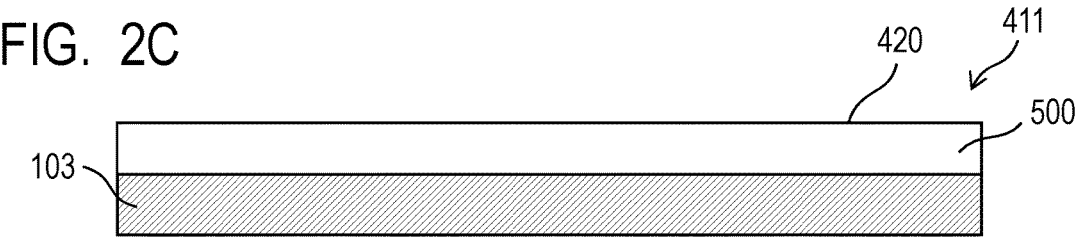
FIG. 2C is a view for illustrating the fluorine coating applied on the first platen glass in one embodiment of the present invention.

Further, as in the third embodiment, when the adjustment member 600 is not provided on any end portion on the original-side surface of the first platen glass 411 in the main scanning direction 501, as illustrated in FIG. 2C, the fluorine coating 103 may extend to both the end portions 503.

In the embodiments described above, as the conductive adhesive member configured to bond the first platen glass 411 and the conductive resin sheet 101 to each other, the conductive double-sided adhesive tape is exemplified. However, a conductive adhesive may be used instead.

When the above-mentioned embodiments are similarly applied to the second platen glass 412, the configuration of the embodiment different from that applied to the first platen glass 411 may be applied to the second platen glass 412.

In this case, the adjustment members 600 provided on the first platen glass 411 and adjustment members (second abutment members) (not shown) provided on the second platen glass 412 may be different from each other in number.

Specifically, any one of the first to third embodiments is applied to the first platen glass 411, whereas the first embodiment or the third embodiment is applied to the second platen glass 412.

This is because a condition as in the above-mentioned second embodiment is not established among the second platen glass 412, the second platen roller 408, and a platen roller holder (second holding member) (not shown) that has the same structure as that of the platen roller holder 700 and is configured to hold the second platen roller 408.

There is exemplified the image reading apparatus including the first image reading unit 414 configured to read the front surface of the original, and another second image reading unit 415 configured to read the back surface of the original. However, the present invention is also applicable to an image reading apparatus including only one image reading unit. For example, the present invention is also applicable to an image reading apparatus structured so as to turn over the original after reading one surface of the original, and to convey the original to an image reading unit again.

According to the present invention, there can be provided the image reading apparatus including the platen glass capable of reducing adhesion of both the floating dirt and the adhesive dirt.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-106433, filed May 30, 2017, which is hereby incorporated by reference herein in its entirety.

What is claimed is:

1. An image reading apparatus, comprising:
a document feeding unit configured to convey a document;
a transparent member;
a reading element configured to read, through the transparent member, an image on a first surface of the document conveyed by the document feeding unit; and
a conductive sheet, which is a resinous sheet and is grounded, provided in a first region on a surface of the transparent member,
wherein a fluorine-containing organic compound is coated in a second region on the surface of the transparent member to be brought into contact with the first surface of the document, the second region being positioned downstream with respect to the first region in a first direction in which the document is conveyed, and
wherein the first region includes a region free from a region where the fluorine-containing organic compound is coated.

2. The image reading apparatus according to claim 1, wherein the conductive sheet is bonded on the first region by a conductive adhesive member.

3. The image reading apparatus according to claim 1, wherein the document feeding unit is configured to turn with respect to a reading unit, which includes the transparent member and the reading element,
wherein the document feeding unit includes a first conveying member and a protrusion configured to form a gap between the first conveying member and the surface of the transparent member, and
wherein a first abutment member is provided at a third region, on the transparent member, corresponding to a region where the protrusion is positioned in a state where the document feeding unit is closed with respect to the reading unit.

4. The image reading apparatus according to claim 3, wherein the gap is 0.1 mm to 1.0 mm.

5. The image reading apparatus according to claim 3, wherein the first abutment member includes a metal plate.

6. The image reading apparatus according to claim 3, wherein the third region includes a region free from the region where the fluorine-containing organic compound is coated.

7. The image reading apparatus according to claim 3, wherein the first abutment member is bonded on the third region by an adhesive member.

8. The image reading apparatus according to claim 3, wherein the third region is positioned outside an image reading region of the reading element.

9. The image reading apparatus according to claim 3, wherein the document feeding unit includes:
a second transparent member;
a second reading element configured to read, through the second transparent member, an image on a second surface opposite to the first surface of the document; and
a second conductive sheet, which is a resinous sheet and is grounded, provided in a fourth region on a surface of the second transparent member,
wherein a fluorine-containing organic compound is coated in a fifth region on the surface of the second transparent member to be brought into contact with the second surface of the document, the fifth region being positioned downstream with respect to the fourth region in the first direction.

10. The image reading apparatus according to claim 9, wherein the document feeding unit includes a second conveying member and a second protrusion configured to form a gap between the second conveying member and the surface of the second transparent member,
wherein a second abutment member is provided at a sixth region, on the second transparent member, corresponding to a region where the second protrusion is positioned.

11. The image reading apparatus according to claim 1, wherein the conductive sheet provided on the transparent member has an electric resistance value of 500 kΩ or less.

12. The image reading apparatus according to claim 1, wherein the conductive sheet provided on the transparent member includes an ultra high molecular weight polyethylene sheet.

13. The image reading apparatus according to claim 1, wherein, in a third direction perpendicular to the surface of the transparent member, a distance between the surface of the transparent member and a surface of the conductive sheet is 0.05 mm to 1.0 mm.

14. The image reading apparatus according to claim 1, wherein the fluorine-containing organic compound includes a silicon-containing perfluoropolyether compound.

15. The image reading apparatus according to claim 1, wherein the fluorine-containing organic compound includes a silicon.

16. An image forming apparatus, comprising:
a document feeding unit configured to convey a document;
a transparent member;
a reading element configured to read, through the transparent member, an image on a first surface of the document conveyed by the document feeding unit;
a conductive sheet, which is a resinous sheet and is grounded, provided in a first region on a surface of the transparent member; and
an image forming unit configured to form an image on a material based on an image read by the reading element,
wherein a fluorine-containing organic compound is coated in a second region on the surface of the transparent member to be brought into contact with the first surface of the document, the second region being positioned downstream with respect to the first region in a first direction in which the document is conveyed, and
wherein the first region includes a region free from a region where the fluorine-containing organic compound is coated.

* * * * *